United States Patent [19]

Koppel et al.

[11] Patent Number: 5,797,260
[45] Date of Patent: Aug. 25, 1998

[54] PULSE ROCKET ENGINE

[75] Inventors: Christophe Koppel, Nandy; Laurent Maine, Ury, both of France

[73] Assignee: Societe Europeenne de Propulsion, Suresnes, France

[21] Appl. No.: 644,561

[22] Filed: May 10, 1996

[30] Foreign Application Priority Data

May 11, 1995 [FR] France ................... 9505572

[51] Int. Cl.[6] .................................................. F02K 9/44
[52] U.S. Cl. .................................................. 60/247; 60/258
[58] Field of Search .................................. 60/39.48, 39.76, 60/39.78, 247, 257, 258, 259

[56] References Cited

U.S. PATENT DOCUMENTS

| | | | |
|---|---|---|---|
| 2,810,259 | 10/1957 | Burdett | 60/258 |
| 3,097,483 | 7/1963 | Bixson et al. | 60/39.48 |
| 3,680,310 | 8/1972 | Arvidson | 60/39.48 |
| 4,722,185 | 2/1988 | Campbell | 60/247 |
| 4,726,184 | 2/1988 | Russell | 60/247 |

FOREIGN PATENT DOCUMENTS 2446385  8/1980  France .
2067740  7/1981  United Kingdom .
2081847  2/1982  United Kingdom .

*Primary Examiner*—Louis J. Casaregola
*Attorney, Agent, or Firm*—Weingarten, Schurgin, Gagnebin & Hayes LLP

[57] ABSTRACT

A liquid propellant rocket engine comprising a chamber body connected to a converging/diverging thrust nozzle and to at least one lightly pressurized propellant feed duct, said body including a body bore in which an injector-forming piston can move longitudinally between a rest first position and an operating second position, the piston comprising a piston head and a piston rod, and subdividing the chamber body bore into a combustion chamber in front of the piston, and at least one injection chamber surrounding the piston rod, the chamber body further including a flow section that is closed in said rest position to prevent any propellant being fed from the injection chamber(s) and that is opened when the piston moves from said rest position to said operating position in order to allow the injection chamber(s) to be filled via said flow section directly from the feed duct(s), the propellant(s) being injected into the combustion chamber via injection channels formed between the combustion chamber and the injection chamber(s), displacement of the piston being a function, in particular, of the pressures in the feed duct(s), in the injection chamber(s), and in the combustion chamber.

16 Claims, 4 Drawing Sheets

PULSE ROCKET ENGINE

FIELD OF THE INVENTION

The present invention relates to a rocket engine capable of operating intermittently with very high combustion pressure and designed more particularly for miniaturized thrust systems such a those that may be used in satellites or in interceptor vehicles.

PRIOR ART

It is possible to generate pulses of thrust from a conventional rocket engine architecture that normally produces thrust continuously by acting on the control sequence applied to the injection valve of the engine. Thus, by successively exciting said valve and not exciting said valve, it is possible to cause successive pulses of thrust to be delivered periodically, thus enabling the engine to operate intermittently. However, with such a conventional architecture, it is practically impossible to generate pulses of a fixed value that is reproducible and efficient, in particular because of the large amounts of "dead" volume, i.e. volume that exists between the injection valve and the injector and that is necessarily included in that type of rocket engine.

Thus, special rocket engine architectures have been developed that are specifically adapted to pulse operation. In application FR 2 446 385 filed in 1979 by Rockwell International Corporation, the rocket engine described includes a differential type piston that subdivides the combustion chamber of a loading chamber into which one or two liquid propellants can be introduced from storage tanks under the action of centrifugal force. The piston is displaced by the action of a control device which, in the example shown, is present in the form of a tank of gas under pressure that feeds the loading chamber via a solenoid valve. In application FR 1 565 785, filed in 1968 by Bölkow GmbH, the installation shown for feeding propellant comprises a cylinder, a differential piston, two metering chambers designed to receive the liquid propellants, and an expansion compartment connected to the combustion chamber by a central pipe along which the combustion gases flow under pressure. The metering chambers naturally refill after each stage of operation from propellant storage tanks that are under low pressure, and non-return valves are connected at the inlets to said chambers to prevent the propellants flowing back into the tanks. Similarly, high pressure valves are inserted at the outlets from the metering chambers to enable or prevent propellant injection into the combustion chamber. Combustion is started by operating the control levers of the valves that release the propellants into the combustion chamber.

Compared with conventional architectures, the above-described devices have the advantage of being suitable for being dimensioned as a function of a single maximum determined operating time, thereby making it possible to use a structure that is much lighter in weight than are the structures of prior devices. Unfortunately, they still suffer from several drawbacks. In particular, combustion is started (the engine is put into operation) by means of special control mechanisms (a tank under pressure and a solenoid valve, high pressure valves), thereby considerably increasing the overall mass of the device (which is also of great importance in space applications) and such means are complex to control. In addition, the presence of non-return elements acting on the propellants or the combustion gases is essential for implementing that rocket engine, and if one of those elements should break or cease to operate there is a danger that the entire operation of the engine will be interrupted, thereby causing the corresponding mission to be lost. In addition, it is difficult to dimension such non-return elements, and it is generally necessary to provide a plurality thereof, as specified in above-mentioned patent application FR 2 446 385.

OBJECT AND BRIEF DEFINITION OF THE INVENTION

An object of the present invention is to provide a pulse rocket engine which mitigates the drawbacks of prior art devices by proposing a novel architecture which is more compact and cheaper, and which also guarantees greater security for thrust systems that use said engine, while nevertheless being entirely compatible for use with conventional thrust systems in spite of the very high combustion pressure that the novel architecture implies.

This object is achieved by a liquid propellant rocket engine comprising a chamber body connected to a converging/diverging thrust nozzle and to at least one lightly pressurized propellant feed duct, said body including a body bore in which an injector-forming piston can move longitudinally between a rest first position and an operating second position, the piston comprising a piston head and a piston rod, and subdividing the chamber body bore into a combustion chamber in front of the piston, and at least one injection chamber surrounding the piston rod, wherein the chamber body further includes a flow section that is closed in said rest position to prevent any propellant being fed from the injection chamber(s) and that is opened when the piston moves from said rest position to said operating position in order to allow the injection chamber(s) to be filled via said flow section directly from the feed duct(s), the propellant(s) being injected into the combustion chamber via injection channels formed between the combustion chamber and the injection chamber(s), displacement of the piston being a function, in particular, of the pressures in the feed duct(s), in the injection chamber(s), and in the combustion chamber.

This specific structure avoids the drawbacks of the prior art since it becomes possible to generate pulses of thrust automatically one after another without resorting to external control means for starting each cycle, and without resorting to the use of high pressure valves. In addition, the architecture is simplified since the flow passage for propellant is closed during return of the injector, thereby isolating the injection chamber(s) from the feed duct(s), and thus avoiding any need for conventional non-return valves or other, analogous components.

In a particular embodiment, the body of the combustion chamber as extended by a thrust nozzle is secured to the head of the piston to form a moving assembly capable of being displaced longitudinally in the engine body, from the rest position in which the flow section is closed to the operating position in which said section is opened to allow the engine to be fed with propellant.

The flow section is preferably implemented in the form of a recess formed at the inlet to the injection chamber(s) in the bore of the body along which the piston rod slides.

In the embodiment under consideration, the channels for injecting propellant into the combustion chamber can also be constituted by the clearance that exists between the bore of the chamber body and the peripheral surface of the piston head.

In a variant embodiment that enables engine operation to be optimized, the piston head includes a forwardly projecting portion on its front face that faces towards the combustion chamber, which portion can close the throat of the thrust nozzle in full or in part on displacement from the rest position to the operating position.

The rocket engine of the invention also includes a downstream stop that is preferably constituted by a shoulder on the thrust nozzle, and that is designed to limit displacement of the piston in said operating position.

When the engine is fed with two propellants, the piston rod is annular in shape and defines both a central injection chamber and an annular injection chamber, said piston rod including a wall that projects rearwards and that slides in a second annular cavity which is in coaxial alignment with a first annular cavity in which the piston rod slides, in such a manner that said wall defines two concentric cavities for feeding the two propellants from their respective feed ducts. This wall may be replaced by at least one resilient bellows that is fixed, preferably by welding, to an upstream end of the chamber body.

Advantageously, in this two-propellant version, the piston rod slides both externally in a bore of the chamber body and internally on a plunger-forming part that is fixed to the upstream end of said body by resilient fixing means, in such a manner that the connection between the piston and the body which is made slightly flexible in this way limits any risk of the piston jamming during displacement, while still ensuring good sealing.

When only one propellant is fed to the engine, the combustion ignition means advantageously comprise a catalytic bed disposed on the front face of the piston head that faces towards the combustion chamber. In addition, return means may be provided for holding the piston in the rest, first position, in particular when there is no propellant feed.

To stop its operation, the rocket engine of the invention may include locking means for locking the piston in the rest, first position, said locking means may be constituted either by an electromechanical unit comprising an electromagnet which, when excited, causes a locking finger to move into an orifice formed in the piston rod or in any other part secured thereto, or else by an electrohydraulic unit formed by an actuator fed from at least one feed duct via a solenoid valve and on which there can slide a cavity formed in the piston rod, in such a manner that said piston rod can be locked in a determined position under the effect of the pressure forces involved. When at least a portion of the piston, preferably the piston rod, is made of a ferromagnetic material, and at least the upstream end of the chamber body is made of a non-ferromagnetic material, then the locking means may advantageously be constituted by an electromagnetic unit which causes displacement of the piston to be stopped whenever it is excited by control means.

In a particular embodiment, the rocket engine may have non-circular sliding geometry for the piston and it may have a nozzle throat section that is substantially rectangular.

BRIEF DESCRIPTION OF THE FIGS.

Other characteristics and advantages of the present invention appear better from the following description, given by way of non-limiting indication, and with reference to the accompanying drawings, in which.

DETAILED DESCRIPTION OF PREFERRED EMBODIMENTS

Figure 1:
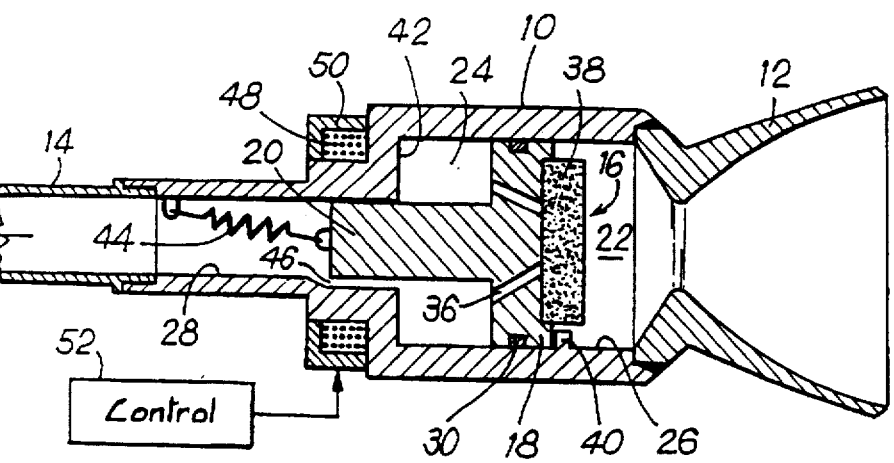
FIG. 1 is a diagrammatic longitudinal view of a rocket engine of the present invention fed with a single propellant.

Reference is made to FIG. 1 which is a diagrammatic longitudinal section through a pulse rocket engine of the invention fed with a single propellant. The rocket engine comprises a circularly symmetrical body 10 about a longitudinal axis having a converging/diverging thrust nozzle 12 connected to the downstream end thereof and having a feed duct 14 for admitting the propellant connected to the upstream end thereof. A T-shaped piston 16 having a piston head 18 and a piston rod 20 is capable of sliding longitudinally inside the body 10 in practically sealed manner (e.g. sealed by a sliding piston ring 30), moving between a rest, first position at the upstream end of the body and an operating, second position downstream therefrom, the piston subdividing the body into a combustion chamber 22 disposed in front of the piston head and in which the combustion gases form, and an annular injection chamber 24 surrounding the piston rod and in which the propellant is stored prior to injection into the combustion chamber. The piston 16 is guided in the body 10 firstly by the piston head 18 which is capable of sliding in a first bore 26 formed in the body 10 parallel to its longitudinal axis, and secondly by the piston rod 20 which is itself capable of sliding in a second bore 28 in coaxial alignment with the preceding bore and formed at an upstream end of the body 10 on the axis of the feed duct 14.

The liquid propellant from a separate source 21 is conveyed, optionally after passing through an isolating valve 32 (used to confine the propellant in sealed manner while it is being stored), to an injection valve 34 from which it can be introduced into the annular injection chamber 24 along the second bore 28 via the feed duct 14. Thereafter it is injected into the combustion chamber 22 via injection channels 36 formed through the piston head 18, after which the propellant is decomposed into a high temperature gas by passing through a catalytic bed 38 placed directly on the front face of the piston head 20 that faces into the combustion chamber 22.

The combustion chamber 22 includes a downstream stop 40 that may advantageously be constituted by a shoulder of the converging/diverging nozzle 12 and that is designed to limit downstream displacement of the injector-forming piston 16 (thereby defining the operating second position), and the end wall of the injection chamber 24 constitutes an upstream stop 42 for the injector (and thus corresponds to the rest, first position). Return means 44 can also be provided to hold the injector 16 in the rest, first position occupied by the engine before being fed with propellant (or during storage). It should be observed that in most cases, friction forces between the moving injector and the chamber body can suffice to hold the injector in the rest firs position.

Where it joins the injection chamber 24, the second bore 28 has a recess 46 which serves to define a flow section through which propellant is injected into said chamber when the injector is in its operating position pressed against the downstream stop 20. Naturally, the piston rod 20 must be dimensioned so as to ensure that said flow section exists in the operating position and, conversely, to ensure that the recess 46 is completely closed off in the rest position when the injector piston 16 is in upstream abutment against the end wall 42 of the injection chamber 24.

A coil 48 and a pole piece 50 forming an open torus may be disposed on an upstream outside wall of the body 10 of the rocket engine so that when appropriately excited by control means 52 (not shown), it enables the injector to be locked in its rest position bearing against the upstream stop 42, in particular when the pressure in the feed duct 13 would otherwise tend to urge said injector towards its operating position.

The operation of a miniaturized rocket engine can be described as follows in simplified manner with reference to FIGS. 2a and 2b. In FIG. 2b, the rest position of the piston (upstream position) corresponds to a stroke d=−4 mm, and the operating position (downstream position) corresponds to a stroke d=0 mm. Prior to use, the return means 44 guarantee that the injector 16 is pressed against the upstream stop 42. On first use, the pressurized propellant coming from the tank 21 flows into the feed duct 14 after the injection valve 34 has been opened, thus applying pressure to the free end of the piston rod 20. This pressure from the propellant generates a force that opposes the action of the return means 44, and the friction forces of the piston rings 30, in particular, and also the force on the piston head 18 and on the catalytic bed 38 as generated by the pressure that exists in the combustion chamber 22, and as a result the injector is displaced towards the downstream stop 40 (curve of FIG. 2b).

Figure 2A:
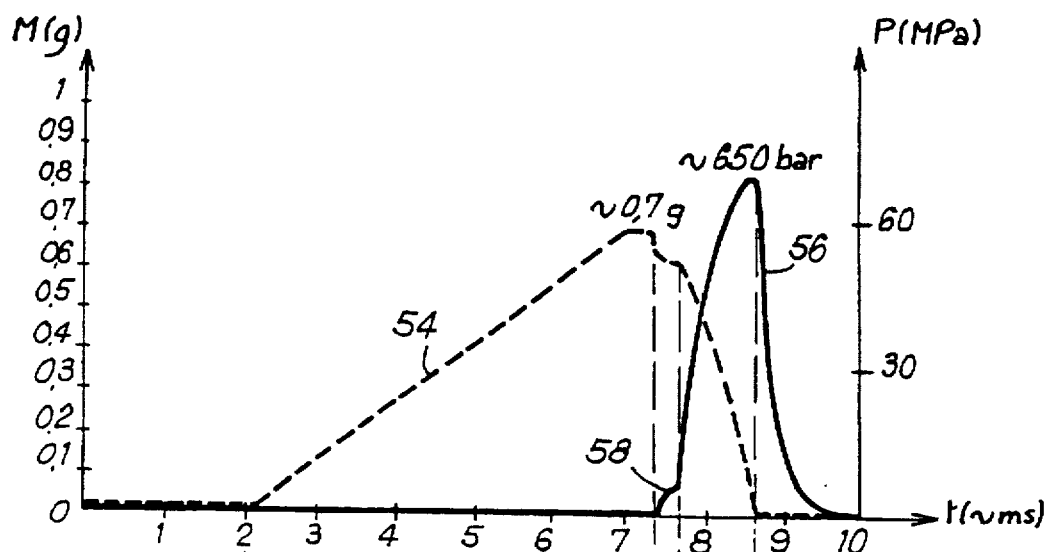
FIGS. 2a and 2b are operating diagrams for a pulse rocket engine of the invention.
Figure 2B:
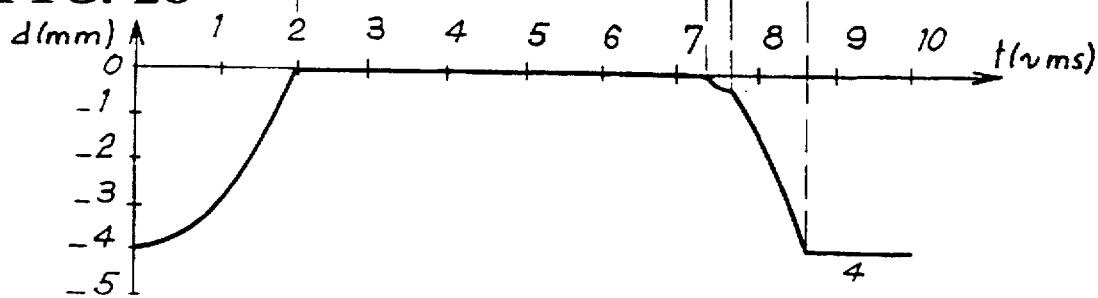

During this first displacement, the flow section of the recess 46 is disengaged and a flow of propellant is then established between the feed duct 14 and the injection chamber 24 via the bore 28 (dashed line curve 54 in FIG. 2a represents the integral of this "filling" flow rate, i.e. it shows the mass of propellant contained in the injection chamber as a function of elapsed time). Once the chamber is full, and after a hammer shock, the pressure in the chamber causes the propellant to be injected into the combustion chamber 22 via the channels 36. The propellant then passes through the catalytic bed 38 where it is decomposed into high temperature gas. It may nevertheless be observed that given the time required for such decomposition, a certain amount of propellant ready for decomposition can accumulated in the combustion chamber 22. The decomposition gives rise to a sudden increase in the pressure inside the combustion chamber to a value that is greater than the pressurization pressure of the propellant and sufficient to generate forces that oppose the force causing the piston 16 to advance, as represented by the solid line curve 56 in FIG. 2a, in which there can be seen an "ignition peak" 58 which is also typical in certain conventional engines.

The piston 16 is then subjected to second displacement in the opposite direction to the preceding displacement, from the downstream stop 40 towards the upstream stop 42 (the end wall of the injection chamber 24), thereby deliberately giving rise to propellant being injected into the combustion chamber 22 through the channels 36 and the catalytic bed 38 and also returning a portion (a very small portion, and in any event a portion that is negligible compared with the total volume of the injection chamber 24) back into the feed duct 14 through the bore 28 via the flow section of the recess 46 which is still open but which is decreasing very quickly as the piston 16 recoils. Once the flow section is completely closed off, the propellant present in the injection chamber is pressurized even more strongly by a differential piston effect and is thus forced to inject into the combustion chamber 22 passing via the channels, and the catalytic bed, thereby giving rise to a rapid increase in the chamber pressure (for example to reach a chamber pressure of 650 bars compared with a nominal feed pressure of 20 bars). This pressure emphasizes rearward displacement of the piston 16 until it stabilizes when the piston makes contact with the end wall of the injection chamber 24 at a value that is determined by the geometrical and functional characteristics of the rocket engine. In this position, the piston has returned to its initial, rest location against the upstream stop 42, but the pressure conditions in the combustion chamber 22 are now very different. It is only after a determined length of time that the combustion gases exhausted via the nozzle 12 enable the pressure in the combustion chamber 22 to decrease rapidly so that it returns to the initial pressure conditions, after which new cycles can be engaged without interruption, automatically and one after another, for so long as the feed pressure continues to act on the piston rod 16 (i.e. until no more propellant remains in the tank 21).

Naturally, it is also possible to stop operation of the engine at any time by preventing the piston 16 from moving, either by reducing the feed pressure (in practice by closing the injection valve 34), or by exciting the coil 50 which is appropriately dimensioned to be able to block the piston, even if the pressure in the feed duct is at its nominal value. When blocking is performed in this manner, it is naturally appropriate for the piston 16 to be made at least in part out of a ferromagnetic material, it being assumed that the upstream end of the body 10 is not ferromagnetic.

Figure 3:
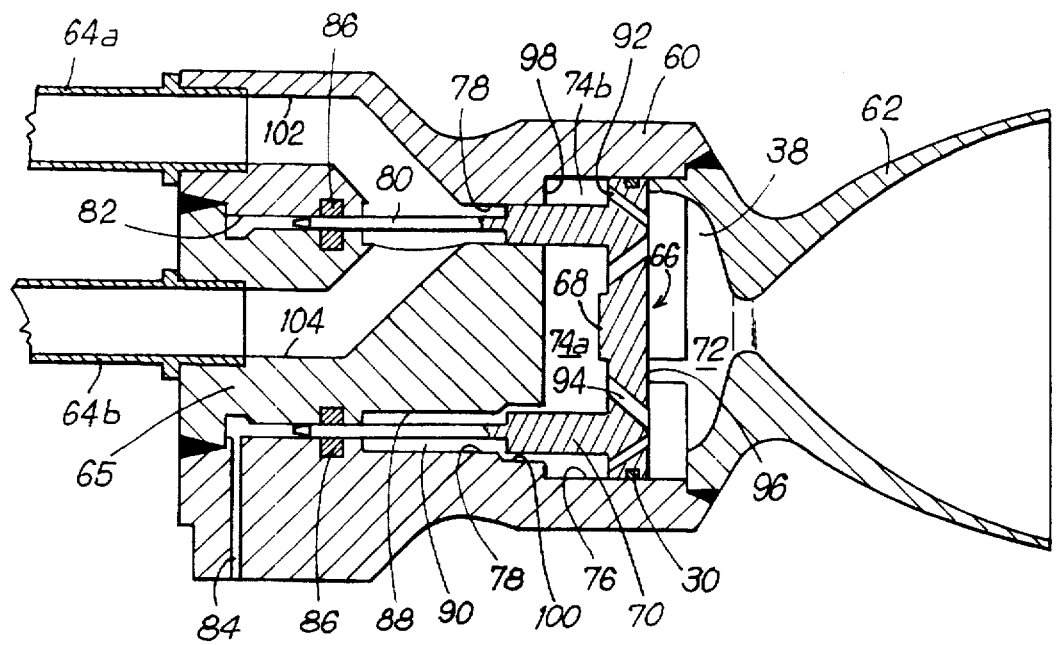
FIGS. 3 and 3a are diagrammatic longitudinal views of rocket engines of the invention fed with two propellants.
Figure 3A:
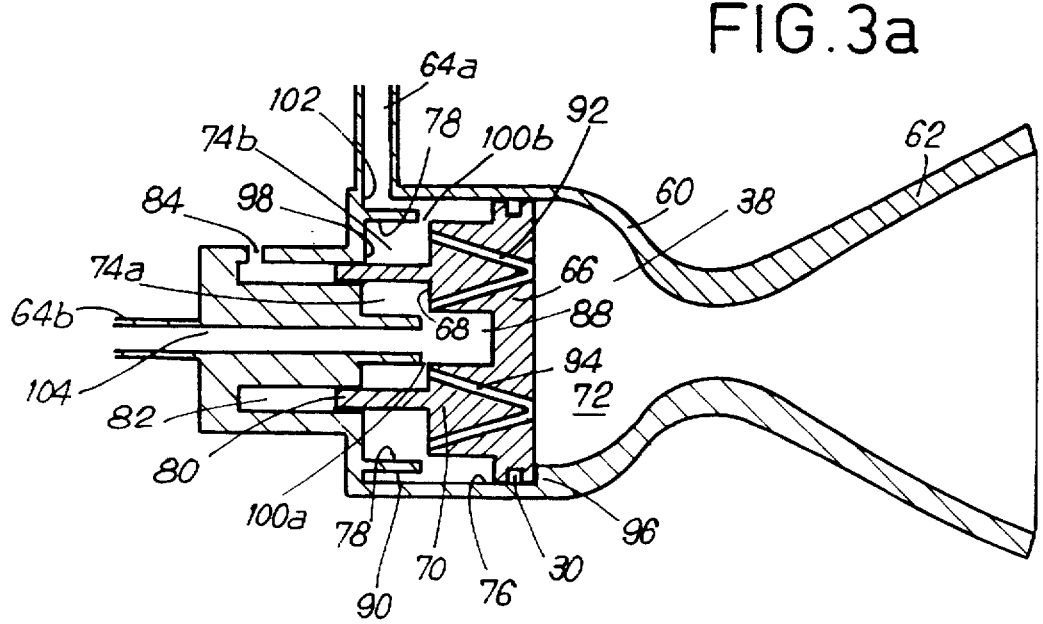

FIGS. 3 and 3a are diagrammatic longitudinal section views of a rocket engine of the invention fed with two propellants, preferably hypergolic. Although it is advantageous and desirable for the propellants to be hypergolic since that gives rise to spontaneous ignition when they are injected into the combustion chamber, the use of non-hypergolic is naturally also possible, providing suitable ignition means are provided in the combustion chamber.

In FIG. 3, as in the preceding embodiment having a single propellant, the rocket engine comprises a chamber body 60 having a thrust nozzle 62 connected to its downstream end and feed ducts 64a and 64b connected to its upstream end to deliver propellants via an intermediate part 65. A piston 66 including a piston head 68 capable of sliding in a first bore of cylindrical shape 76 and an annular piston rod 70 itself capable of sliding in a first annular cavity 78 in coaxial alignment with the first bore 76 is capable of being displaced longitudinally in practically sealed manner (see for example the sliding piston ring 30) within the body 60, between a rest first position and an operating second position, subdividing said body into a combustion chamber 72 in front of the piston and both a central injection chamber 74a and an annular injection chamber 74b. The annular piston rod 70 is extended by a cylindrical annular wall 80 projecting rearwards and itself capable of sliding in a second annular cavity 82 in coaxial alignment with the first annular cavity 78 and formed in an upstream end of the chamber body 60 in the end wall of said first cavity 78. The second annular cavity 82 is connected to the outside atmosphere via an opening 84 formed in the chamber body 60, e.g. perpendicularly to the longitudinal axis of the rocket engine. O-rings 86 provide sealing for the second annular cavity 82, thereby closing off the upstream end of the chamber body 60 in sealed manner, while defining two independent concentric cavities 88 and 90 on opposite sides of the wall 80 for the purpose of injecting the propellants.

As in the preceding embodiment, the combustion chamber 72 includes a downstream stop 96, e.g. constituted by a shoulder on the converging/diverging nozzle 62, and designed to limit downstream displacement of the injector-forming piston 66 (thus defining the operating, second position). The rearwards limit on displacement of the piston 66 (corresponding to its rest, first position) is preferably determined by an upstream abutment 96 constituted by the end wall of the central injection chamber 74a, or 74b, but the end wall of the first annular cavity 78 or the end wall of the second annular cavity 82 could also perform this function of upstream stop.

Where it joins the injection chambers 74a and 74b, the first annular cavity 78 includes a recess 100 which serves to define a flow section for injecting the propellants into said chambers when the injector is in its operating position in abutment against the downstream stop 96. It is clear that the piston rod 70 which slides in said cavity 78 must be dimensioned so as to ensure that said flow section exists in the operating position, and conversely, to ensure that the recess 100 is completely shut off in the rest position, with the injector piston 66 then being in upstream abutment 98 against the end wall of the central injection chamber 74a.

This configuration makes it possible to use a pulse rocket engine that is optimized with respect to the leakage path between the independent annular cavities 88 and 90, and the cavity 82 which is connected to the "atmosphere" via the opening 84, since the pressure in the cavities 88 and 90 is substantially identical to that in the feed ducts, and is thus at low pressure. This feature is taken advantage of in a compact variant described in further detail with reference to FIG. 4.

The hypergolic propellants coming from separate sources (not shown) are introduced into the concentric cavities 88 and 90 from the feed ducts 14a and 14b via passages 102, 104 formed in the upstream end of the body 60 and in the part 65 and leading into the first annular cavity 78, and they are injected into the combustion chamber 72 through injection channels 92 and 94 pierced through the moving injector 66 and advantageously disposed in the form of a ring of channel pairs.

The operation of the two-propellant pulse rocket engine is similar to that of the engine of FIG. 1, but it should be observed that since the propellants are hypergolic, the ignition means needed with a single propellant (e.g. a catalytic bed) are no longer necessary. Naturally, ignition means would be essential if the propellants were non-hypergolic. It may also be observed that in order to avoid overcrowding the drawing, means for stopping the engine (valve, magnetic device, or other analogous device) by locking the piston in its rest position are not shown.

FIG. 3a shows a pulse rocket engine that is optimized with respect to leakage paths between the central and annular injection chambers 74a and 74b which are subjected to intense pressure, and the feed ducts 64a and 64b which are pressurized only slightly, since during operation (going from the operating position towards the rest position), flow through the flow sections 100a and 100b takes place in the opposite direction to that in which the piston 66, 70 is moving. This gives rise to leakage being braked and thus to the amount of said leakage being reduced. Advantage can be taken thereof by relaxing manufacturing tolerances.

Figure 4:
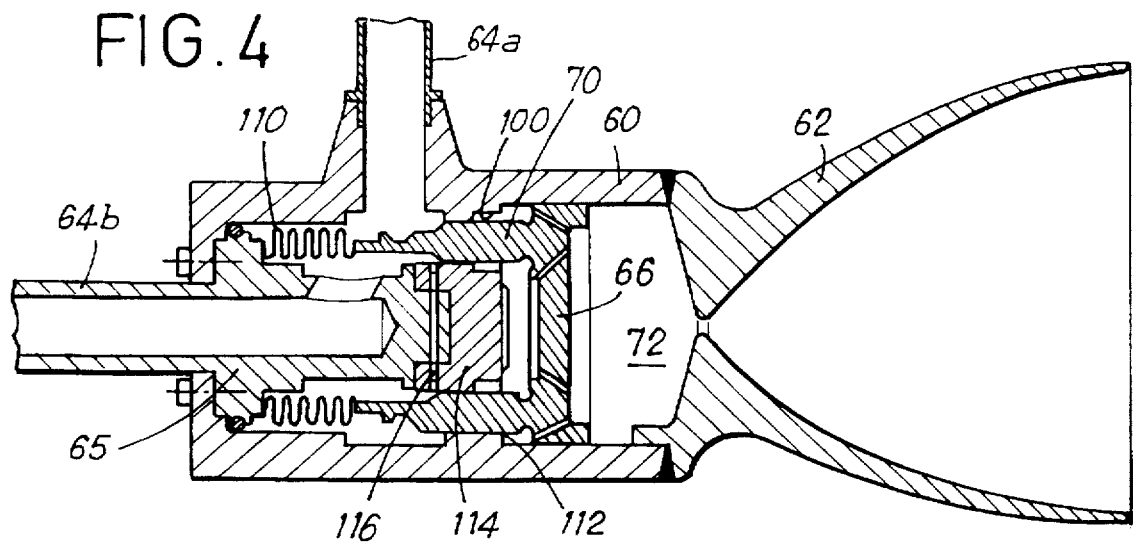
FIG. 4 is a variant embodiment of the rocket engine of FIG. 3.

FIG. 4 shows a compact variant of the FIG. 3 rocket engine. In this variant, the cylindrical annular wall 80 for separating the propellants which is subjected to modest pressure forces only is replaced by at least one resilient bellows 110 which is fixed, preferably by welding to ensure maximum sealing, firstly to the annular rod of the piston 70 and secondly to the upstream end of the intermediate part 65.

In addition, in order to avoid any risk of jamming during displacement of the injector 66, the piston rod 70 which moves externally in a bore 112 of the chamber body slides internally on a floating part 114 which acts as a plunger. This part, which is nevertheless installed to tight tolerances, is secured in flexible manner to the upstream end of the chamber body by resilient fixing means of the resilient pin type 116, for example, so as to make the connection between the injector and the body leakproof and insensitive to jamming.

FIGS. 5 to 8 are highly schematic theoretical diagrams showing variant embodiments of the pulse rocket engine of the invention, for one or two propellants.

Figure 5:
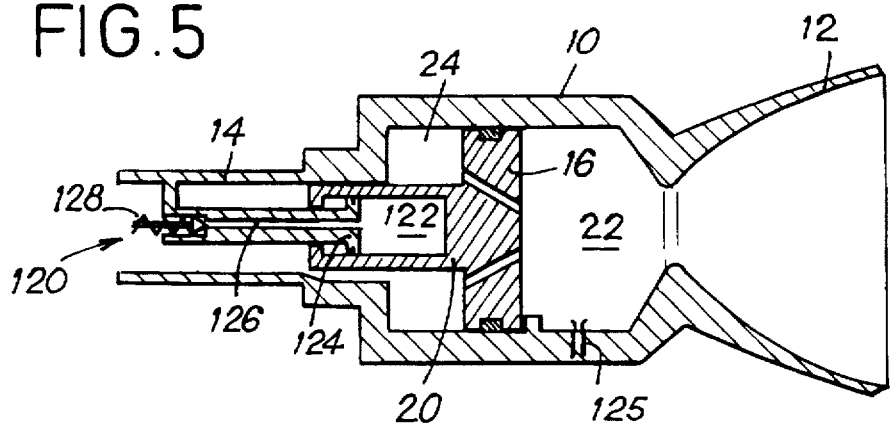
FIG. 5 is a theoretical diagram for a variant embodiment of the single propellant rocket engine of FIG. 1.
Figure 6:
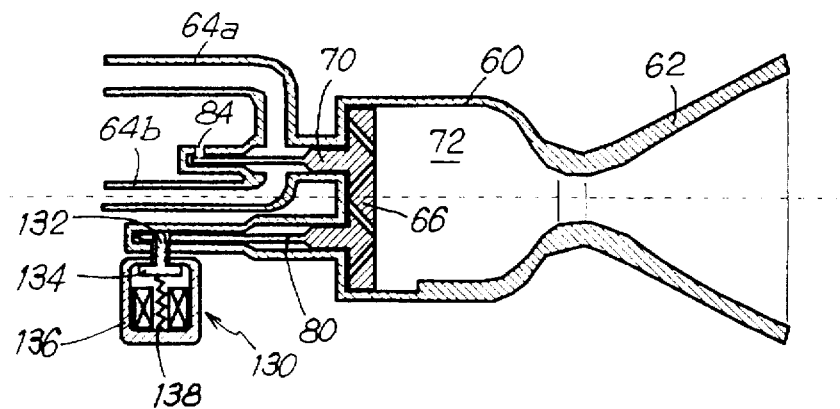
FIG. 6 is a theoretical diagram of another variant embodiment of the two propellant rocket engine of FIG. 3.

In the versions of FIGS. 5 and 6, there can be seen two embodiments of means for locking the injector piston 16 in its initial, rest position firstly by means of an electrohydraulic unit 120 and secondly by means of an electromechanical unit 130. In FIG. 5, the piston rod 20 has a cavity 122 capable of sliding on the inside piston 124 and its other end opens out into the feed duct 14 where it can be closed by a solenoid valve 128. In the example shown, it will be observed that ignition means 125 are provided in the combustion chamber 22. The above-specified locking means operate in a manner similar to that of hydraulic actuators, with propellant admission via the valve 128 and the bore 126 into the cavity 122 serving, under the effect of pressure forces acting on the various members of the device after the solenoid valve has been closed, to lock the piston rod 20 in a determined position (and in particular in its rest position). It may be observed that these locking means have the advantage of making it very easy to obtain pulses of different shapes merely by acting on the solenoid valve 128 in such a manner as to control the recoil of the injector 16. In FIG. 6, the annular wall 80 separating the propellants includes towards its rear end a projection which is pierced by an orifice 132 suitable for receiving a finger 134 actuated by an electromagnetic 136 and held in position by a return spring 138. The injector piston 66 is locked merely by exciting the electromagnet 136 which urges the finger 134 into the orifice 132. The locking finger preferably slides perpendicularly to the displacement direction of the piston rod 70 (and thus of the wall 80) since under circumstances, forces are minimized.

Figure 7A:
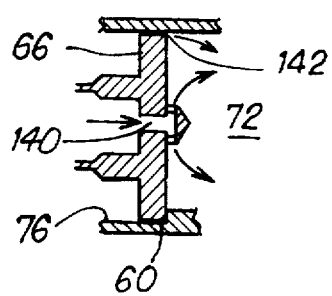
FIGS. 7a and 7b show in highly diagrammatic manner variant embodiments of certain aspects of the FIG. 6 rocket engine.
Figure 7B:
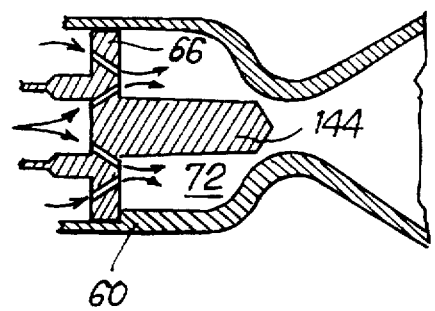

FIGS. 7a and 7b show embodiment details of the injector 66. In FIG. 7a, propellant injection into the combustion chamber 72 no longer takes place via two channels pierced through the injector but takes place simultaneously via a central orifice 140 of the injector and via a gap 142 between the periphery of the injector 66 and the bore 76 in the chamber body 60, which gap may merely be the determined tolerance clearance that exists between the chamber body and the injector. In FIG. 7b, the front face of the injector 66 facing the combustion chamber 72 includes a forwardly projecting portion 144 designed to close the throat of the thrust nozzle to a greater or lesser extent. This portion 144 serves above all to optimize the operation of the rocket engine, but it may also act as a downstream stop.

Figure 8:
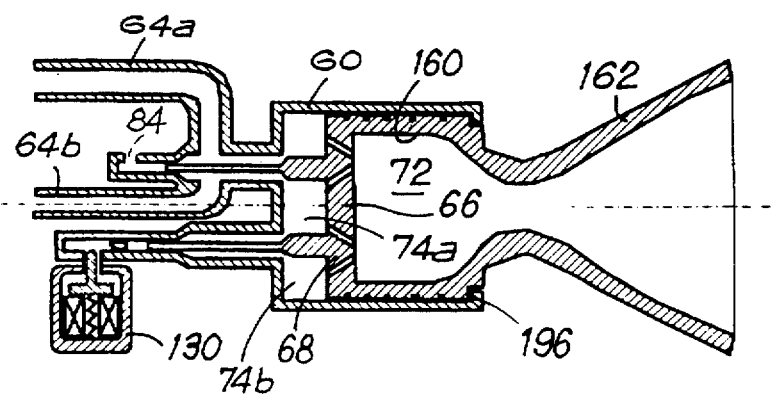
FIG. 8 is a theoretical diagram of yet another variant embodiment of the two propellant rocket engine of FIG. 3.

Finally, FIG. 8 shows a variant embodiment of a pulse rocket engine fed with two propellants. In this embodiment, the injector 66 is provided with a piston head 68 which also constitutes an injection wall for the combustion chamber 72 whose chamber body 160 is connected to a thrust nozzle 162. This moving assembly comprising the injector plus the chamber body plus the nozzle can move longitudinally in the body of the rocket engine 60, a downstream stop 196 constituted by an inwardly directed flange on the body 60 limits such longitudinal displacement. Naturally, as in each of the preceding embodiments, the piston rod is dimensioned in such a way as to enable it to define a flow section for the propellants when said engine is in its operating position with the injector pressed against the downstream stop 196. As shown in the figure, this flow section can be the result merely of relative displacement between the piston rod and the bore for said rod, without it being necessary to form any hollow in said bore, like the embodiments shown in FIGS. 1, 3, and 4.

The person skilled in the art can naturally envisage other variants and adaptations based on the embodiments described above, without going beyond the ambit of the invention. Thus, for example, it is not essential for the chamber body to have a section that is circular, and it is entirely possible to envisage a non-circular shape for the sliding piston together with a nozzle throat section that is substantially rectangular.

Because it is extremely compact, the present invention is particularly suited to miniaturized thrust systems. In satellites, it is particularly appropriate for use in auxiliary or emergency systems. Such systems can also be selected for aerodynamic maneuvering of missiles as a replacement for conventional control surfaces. More generally, in the field of aviation, such pulse rocket engines may constitute test machines for generating vibrations for studying the mechanical behavior of very large structures. It should also be observed that there is a possible application to anti-skidding systems for motor driven land vehicles, where the variable thrust with a short response time as provided by such a rocket engine can make it possible to compensate the loss of grip caused by centrifugal force.

Finally, it may be observed that although rocket engines of the invention provide intermittent thrust, it is possible to combine a plurality of engines in a thrust unit so as to obtain continuous thrust like that of a piston engine.

We claim:

1. A liquid propellant rocket engine comprising a chamber body connected to a converging/diverging thrust nozzle and to at least one lightly pressurized propellant feed duct, said body including a body bore in which an injector-forming piston can move longitudinally between a rest first position and an operating second position, the piston comprising a piston head and a piston rod, and subdividing the chamber body bore into a combustion chamber in front of the piston, and at least one injection chamber surrounding the piston rod, wherein the chamber body further includes a flow section that is closed in said rest position to prevent any propellant being fed from the injection chamber(s) and that is opened when the piston moves from said rest position to said operating position in order to allow the injection chamber(s) to be filled via said flow section directly from the feed duct(s), the propellant(s) being injected into the combustion chamber via injection channels formed between the combustion chamber and the injection chamber(s), displacement of the piston being a function, in particular, of the pressures in the feed duct(s), in the injection chamber(s), and in the combustion chamber.

2. A rocket engine according to claim 1, wherein said flow section is provided by a recess formed at the inlet to the injection chamber(s) in the body bore along which the piston rod slides.

3. A rocket engine according to claim 1, wherein said propellant injection channels into the combustion chamber are constituted by clearance existing between the bore of he chamber body and the peripheral surface of the piston head.

4. A rocket engine according to claim 1, wherein said piston head includes a forwardly projecting portion on its front face facing into the combustion chamber which portion can close the throat of the thrust nozzle in full or in part during displacement thereof from the rest position to the operating position.

5. A rocket engine according to claim 1, further including a downstream stop formed by a shoulder of the thrust nozzle and designed to limit displacement of the piston in said operating position.

6. A rocket engine according to claim 1, fed with two propellants, wherein the piston rod is annular in shape and defines both a central injection chamber and an annular injection chamber, said piston rod including a wall that projects rearwards and slides in a second annular cavity that is in coaxial alignment with a first annular cavity in which the piston rod slides, such that such wall defines two concentric cavities for feeding the two propellants from their respective feed ducts.

7. A rocket engine according to claim 6, wherein said wall is replaced by at least one resilient bellows fixed, preferably by welding, to an upstream end of the chamber body.

8. A rocket engine according to claim 6, wherein the piston rod slides both externally in a bore of the chamber body and internally on a plunger-forming part fixed to the upstream end of said body by resilient fixing means, such that the connection between the piston and the body provides good sealing and limits any risk of the piston jamming during displacement thereof.

9. A rocket engine according to claim 1, fed with a single propellant, the engine including ignition means for igniting combustion.

10. A rocket engine according to claim 9, wherein said ignition means comprise a catalytic bed disposed on the front face of the piston head facing towards the combustion chamber.

11. A rocket engine according to claim 1, also including return means for holding the piston in the rest, first position, in particular in the absence of any propellant feed.

12. A rocket engine according to claim 1, wherein, to cause it to stop operating, it further includes locking means for locking the piston in the rest, first position.

13. A rocket engine according to claim 12, in which at least a portion of the piston, and a piston rod, is made of a ferromagnetic material, and at least the upstream end of the chamber body is made of a nonferromagnetic material, wherein said locking means are constituted by an electromagnetic unit which, when excited by control means, causes displacement of the piston to stop.

14. A rocket engine according to claim 12, wherein said locking means are constituted by an electromagnetic unit comprising an electromagnet which, when excited, causes a locking finger to move into an orifice formed in the piston rod or in any other part secured thereto.

15. A rocket engine according to claim 12, wherein said locking means are constituted by an electrohydraulic unit constituted by an actuator fed from at least one feed duct via a solenoid valve, and on which a cavity formed in the piston rod can slide in such a manner that said piston rod is capable of being locked in a determined position under the effect of the pressure forces involved.

16. A rocket engine according to claim 1, having noncircular sliding geometry for the piston and a nozzle throat that is of substantially rectangular section.

* * * * *